US008652704B2

(12) United States Patent
Sano et al.

(10) Patent No.: US 8,652,704 B2
(45) Date of Patent: Feb. 18, 2014

(54) DIRECT ALCOHOL FUEL CELL WITH CATHODE CATALYST LAYER CONTAINING SILVER AND METHOD FOR PRODUCING THE SAME

(75) Inventors: Atsushi Sano, Tokyo (JP); Satoshi Maruyama, Tokyo (JP)

(73) Assignee: TDK Corporation, Tokyo (JP)

( * ) Notice: Subject to any disclaimer, the term of this patent is extended or adjusted under 35 U.S.C. 154(b) by 601 days.

(21) Appl. No.: 10/591,176

(22) PCT Filed: Jun. 29, 2005

(86) PCT No.: PCT/JP2005/011963
§ 371 (c)(1),
(2), (4) Date: Aug. 30, 2006

(87) PCT Pub. No.: WO2006/003943
PCT Pub. Date: Jan. 12, 2006

(65) Prior Publication Data
US 2007/0166601 A1      Jul. 19, 2007

(30) Foreign Application Priority Data

Jun. 30, 2004  (JP) ................................. 2004-194656

(51) Int. Cl.
*H01M 4/38*         (2006.01)
(52) U.S. Cl.
USPC ............................ 429/485; 429/482; 429/492
(58) Field of Classification Search
USPC ......................................... 429/482, 485, 492
See application file for complete search history.

(56) References Cited

U.S. PATENT DOCUMENTS

| 4,828,941 | A | * | 5/1989 | Sterzel .......................... 429/490 |
| 6,100,324 | A | | 8/2000 | Choi et al. |
| 6,238,534 | B1 | * | 5/2001 | Mao et al. ..................... 204/416 |
| 6,268,430 | B1 | | 7/2001 | Choi et al. |
| 2002/0127474 | A1 | * | 9/2002 | Fleischer et al. .............. 429/309 |
| 2003/0219645 | A1 | * | 11/2003 | Reichert et al. ................. 429/42 |
| 2004/0028992 | A1 | * | 2/2004 | Jaouen ............................ 429/42 |
| 2004/0236157 | A1 | * | 11/2004 | Heilgendorff et al. ........ 568/881 |

FOREIGN PATENT DOCUMENTS

| CA | 2 448 447 A1 | 1/2003 |
| CA | 2 453 024 A1 | 1/2003 |
| CN | 1297457 A | 5/2001 |
| CN | 1425499 A | 6/2003 |
| CN | 1426127 A | 6/2003 |
| JP | A 57-63137 | 4/1982 |

(Continued)

OTHER PUBLICATIONS

JPO IPDL machine translation of JP2004134132, published Apr. 30, 2004, retrieved Feb. 25, 2009.*

(Continued)

*Primary Examiner* — Zachary Best
(74) *Attorney, Agent, or Firm* — Oliff PLC

(57) ABSTRACT

The direct alcohol fuel cell of the present invention is a direct alcohol fuel cell comprising an anode 20 having an anode catalyst layer 2, a cathode 30 having a cathode catalyst layer 3, and a solid polymer electrolyte membrane 1 arranged between the anode 20 and cathode 30, the direct alcohol fuel cell generating electricity by supplying the anode 20 with alcohol and water; wherein the cathode catalyst layer 3 contains a metal complex and/or a metal complex fired product formed by firing the metal complex as a catalyst.

12 Claims, 3 Drawing Sheets

(56) References Cited

FOREIGN PATENT DOCUMENTS

| | | | | |
|---|---|---|---|---|
| JP | A 11-007964 | 1/1999 | | |
| JP | A 11-016584 | 1/1999 | | |
| JP | A 2002-15744 | 1/2002 | | |
| JP | A 2002-056857 | 2/2002 | | |
| JP | A 2003-109614 | 4/2003 | | |
| JP | A 2003-317742 | 11/2003 | | |
| JP | A 2003-331869 | 11/2003 | | |
| JP | 2004134132 * | 4/2004 | ............. | H01M 8/18 |
| JP | A 2005-228497 | 8/2005 | | |
| JP | A 2005-235437 | 9/2005 | | |
| WO | WO 03/007411 A2 | 1/2003 | | |
| WO | WO03004156 * | 1/2003 | ............... | B01J 31/00 |
| WO | WO2004021486 * | 3/2004 | ............. | H01M 8/00 |
| WO | WO 2004/036674 A2 | 4/2004 | | |

OTHER PUBLICATIONS

Kerres et al. Preparation, characterization and fuel cell application of new acid-base bled membranes. J. New. Mat. Electrochem. Sys., 3, 129-239 (2000).*

* cited by examiner

DIRECT ALCOHOL FUEL CELL WITH CATHODE CATALYST LAYER CONTAINING SILVER AND METHOD FOR PRODUCING THE SAME

TECHNICAL FIELD

The present invention relates to a direct alcohol fuel cell which directly uses an alcohol as a fuel, and a method of manufacturing the same.

BACKGROUND ART

Attention has recently been focused on fuel cells as an energy supply source which has a high power generation efficiency and theoretically yields only water as a reaction product, while being excellent in environmental friendliness. Depending on species of electrolytes employed, such fuel cells are roughly classified into low-temperature operating fuel cells such as those of alkali, solid polymer, and phosphate types, and high-temperature operating fuel cells such as those of molten carbonate and solid oxide types. Among them, polymer electrolyte fuel cells (PEFCs) using a solid polymer as their electrolyte, which can attain a high density/high output in a compact structure while being operable in a simple system, have been widely studied not only as a stationary distributed power supply but also as a power supply for vehicles and the like, and have been greatly expected to come into practical use.

One of such PEFCs is a direct alcohol fuel cell which directly uses an alcohol as its fuel, in which a direct methanol fuel cell (DMFC) using methanol as its fuel has been known in particular. When methanol and water are supplied to an anode (fuel electrode) of the DMFC, methanol is oxidized by water, so as to generate a hydrogen ion. The hydrogen ion migrates through the electrolyte to a cathode (air electrode), thereby reducing oxygen fed to the cathode. According to these redox reactions, a current flows between both electrodes.

Thus, the direct alcohol fuel cell can directly use alcohol, which is a fuel, for power generation without modifying it into hydrogen and the like, and thus has a simple structure without necessitating a separate device for fuel modification. Therefore, the direct alcohol fuel cell can be made smaller and lighter very easily, and can favorably be used for a portable power supply and the like.

As a polymer electrolyte membrane for such a direct alcohol fuel cell, proton-conducting ion exchange membranes are usually employed, among which ion exchange membranes made of perfluorocarbon polymers having sulfonate groups are widely used in particular. On the other hand, each of the anode and cathode is constructed, for example, by two layers, i.e., a catalyst layer to become a reaction site for an electrode reaction and a diffusion layer for supplying a reactant to the catalyst layer, giving/receiving electrons, and so forth.

However, such a direct alcohol fuel cell has been known to cause the following problem, since alcohol is directly supplied to the anode. Namely, so-called "crossover" occurs, in which alcohol infiltrates the electrolyte membrane and reaches the cathode because of a high affinity of the solid polymer electrolyte membrane to alcohol and a concentration gradient. While platinum or the like which is highly active in oxygen reduction is employed as a catalyst in the cathode, alcohol having reached the cathode is immediately oxidized on platinum, so as to produce aldehydes, carbon monoxide, or carbon dioxide. Therefore, when the crossover occurs, the cathode attains a mixed potential of oxygen reduction and the oxidation of alcohol as mentioned above, and thus lowers the potential, thereby decreasing the cell voltage.

Thus, the crossover phenomenon has become a major cause of deterioration in performances of direct alcohol fuel cells. Therefore, various studies concerning the electrolyte membrane have been made in order to suppress the crossover. For example, Patent Document 1 discloses an electrolyte membrane containing a metal oxide, Patent Document 2 discloses an arrangement of a limiting permeable layer for restricting the permeation of a liquid fuel between a cathode and a solid electrolyte membrane, and Patent Document 3 discloses that an electrolyte membrane constituted by a first electrolyte layer and a second electrolyte layer which is less permeable to organic fuels than is the first electrolyte layer is arranged such that the first electrolyte layer is on the anode side. These methods suppress the crossover.

Patent Document 1: Japanese Patent Application Laid-Open No. 2003-331869
Patent Document 2: Japanese Patent Application Laid-Open No. 2003-317742
Patent Document 3: Japanese Patent Application Laid-Open No. 2002-56857

DISCLOSURE OF THE INVENTION

Problem to be Solved by the Invention

Even when the electrolyte membranes described in Patent Documents 1 to 3 are used, the permeation of alcohol is hard to prevent completely. Therefore, alcohol gradually permeates, so as to lower the cell voltage, which makes it hard to attain a sufficient output voltage stably for a long period. Also, while the electrolyte membranes are aimed at conducting protons, mixing a material not contributing to the proton conduction into the electrolyte membrane or providing a layer suppressing the permeation of alcohol as described in Patent Documents 1 to 3 may become a cause of lowering the proton conductivity.

For restraining the crossover from occurring, a method of lowering the alcohol concentration in a fuel by mixing a greater amount of water into alcohol has also been carried out. In this case, the alcohol concentration becomes about $\frac{1}{5}$ to $\frac{1}{20}$ of a theoretically ideal alcohol concentration, which makes it hard to attain a sufficient energy density.

In view of the problems in the prior art mentioned above, it is an object of the present invention in particular to provide a direct alcohol fuel cell which can fully restrain the cell voltage from being lowered by the crossover and can stably attain a sufficient output voltage for a long period, and a method of manufacturing the same.

Means for Solving Problem

For achieving the above-mentioned object, the direct alcohol fuel cell in accordance with a first aspect of the present invention is a direct alcohol fuel cell comprising an anode having an anode catalyst layer, a cathode having a cathode catalyst layer, and a solid polymer electrolyte membrane arranged between the anode and cathode, the direct alcohol fuel cell generating electricity by supplying the anode with alcohol and water; wherein the cathode catalyst layer contains a metal complex and/or a metal complex fired product formed by firing the metal complex as a catalyst.

This direct alcohol fuel cell uses a metal complex and/or a metal complex fired product as a catalyst contained in the cathode catalyst layer. Platinum, which has conventionally been used as a catalyst for a cathode, has an extremely strong action of oxidizing alcohol as mentioned above, and thus is problematic in that it lowers the cell voltage when the crossover occurs. By contrast, the metal complex and metal complex fired product have a sufficiently weak action of oxidizing alcohol, so that they hardly act on alcohol even when alcohol has reached the cathode because of the crossover, and thus can fully restrain the cathode from lowering its potential. Therefore, the direct alcohol fuel cell in accordance with the first aspect of the present invention can fully restrain the cell voltage from being lowered by the crossover and can stably attain a sufficient output voltage for a long period. This also allows the fuel to attain a very high alcohol concentration close to an ideal alcohol concentration, and can greatly improve the energy density of a fuel cell system including the volume of a fuel tank.

Here, it will be preferred if the metal complex has a porphyrin ring or phthalocyanine ring.

This metal complex and the metal complex fired product formed by firing the same exhibit a sufficiently weaker oxidizing power with respect to alcohol while having a sufficient reducing power with respect to oxygen, and thus tend to make it possible to yield a high output voltage while being capable of more fully restraining the cell voltage from being lowered by the crossover.

More preferably, the metal complex includes at least one species of metal selected from the group consisting of Co, Fe, Ni, Cu, Mn, and V as a center metal, while having a porphyrin ring or phthalocyanine ring.

This metal complex and the metal complex fired product formed by firing the same exhibit a very weak oxidizing power with respect to alcohol while having a more sufficient reducing power with respect to oxygen, and thus tend to make it possible to yield a higher output voltage while being capable of more fully restraining the cell voltage from being lowered by the crossover.

Preferably, the catalyst includes a carrier catalyst having a carbon material carrying the metal complex and/or the metal complex fired product. When the cathode catalyst layer contains this carrier catalyst as a catalyst, a three-phase boundary where a gas containing oxygen to become a reactant, the catalyst, and the electrolyte membrane coexist can be increased, whereby the electrode reaction of the cathode can be generated efficiently. As a result, a higher output voltage tends to be attainable.

From the viewpoint of more efficiently causing the electrode reaction of the cathode and further improving the output voltage, it will be preferred if the carrier catalyst is formed by firing the metal complex in a state carried by the carbon material.

The direct alcohol fuel cell in accordance with a second aspect of the present invention is a direct alcohol fuel cell comprising an anode having an anode catalyst layer, a cathode having a cathode catalyst layer, and a solid polymer electrolyte membrane arranged between the anode and cathode, the direct alcohol fuel cell generating electricity by supplying the anode with alcohol and water; wherein the solid polymer electrolyte membrane is an anion exchange membrane; and wherein the cathode catalyst layer contains silver as a catalyst.

This direct alcohol fuel cell uses silver as a catalyst contained in the cathode catalyst layer. As with the above-mentioned metal complex and metal complex fired product, silver has a sufficiently weak action of oxidizing alcohol, so that it hardly acts on alcohol even when alcohol has reached the cathode because of the crossover, and thus can fully restrain the cathode from lowering its potential. Further, the fuel cell in accordance with the second aspect of the present invention uses an anion exchange membrane as an electrolyte membrane. In general, cation exchange membranes are used in electrolyte membranes of fuel cells. When a cation exchange membrane is used in combination with a silver catalyst, however, silver is likely to corrode at a contact interface between the cation exchange membrane and silver, thus causing a problem that the catalyst activity decreases, thereby lowering the output voltage. When the anion exchange membrane and silver catalyst are used in combination as in the present invention, by contrast, silver can fully be restrained from corroding. Namely, the direct alcohol fuel cell in accordance with the second aspect of the present invention can fully restrain the cell voltage from being lowered by the crossover, can fully keep the catalyst from lowering its catalytic activity and can stably attain a sufficient output voltage for a long period. This also allows the fuel to attain a very high alcohol concentration close to an ideal alcohol concentration, and can greatly improve the energy density of a fuel cell system including the volume of a fuel tank. Using the anion exchange membrane and silver catalyst in combination can fully lower the overvoltage in the cathode, and can further improve the energy density.

Preferably, the catalyst includes a carrier catalyst having a carbon material carrying the silver. When the cathode catalyst layer contains this carrier catalyst as a catalyst, a three-phase boundary where a gas containing oxygen to become a reactant, the catalyst, and the electrolyte membrane coexist can be increased, whereby the electrode reaction of the cathode can be generated efficiently. As a result, a higher output voltage tends to be attainable.

Preferably, in the direct alcohol fuel cell in accordance with the first aspect of the invention, the solid polymer electrolyte membrane is an anion exchange membrane.

Using the anion exchange membrane in the electrolyte membrane in the fuel cell in accordance with the first aspect of the invention can also fully restrain the metal complex and metal complex fired product from corroding, thereby being able to improve the stability of the catalyst. This tends to be able to yield a more sufficient output voltage for a long period. Using the anion exchange membrane in combination with the metal complex and/or metal complex fired product can fully lower the overvoltage in the cathode, and thus tends to be able to further improve the energy density.

Preferably, in the direct alcohol fuel cells in accordance with the first and second aspects of the present invention, the anion exchange membrane is constituted by a polymer compound having a cation group within a molecule.

Using this anion exchange membrane tends to be able to more fully restrain the metal complex and/or metal complex fired product and silver in the cathode catalyst layer from corroding and more fully reduce the overvoltage in the cathode.

Preferably, the cation group is at least one species selected from the group consisting of pyridinium, alkylammonium, and imidazolium groups.

Using the anion exchange membrane having the cation group tends to be able to more fully restrain the metal complex and/or metal complex fired product and silver in the cathode catalyst layer from corroding and further fully reduce the overvoltage in the cathode.

Preferably, in the direct alcohol fuel cells in accordance with the first and second aspects of the present invention, an anion exchange membrane is used as the electrolyte membrane, while the cathode catalyst layer contains an anion exchange resin as a binder.

When the cathode catalyst layer contains an anion exchange resin as a binder, anion conduction is favorably effected at a contact interface among the binder, catalyst, and anion exchange membrane, whereby the energy density tends to be able to improve.

Preferably, in the direct alcohol fuel cells in accordance with the first and second aspects of the present invention, the alcohol is at least one species selected from the group consisting of methanol, ethanol, ethylene glycol, glycerin, and erythritol.

Using these alcohols as a fuel tends to make it easier to improve the energy density of the fuel cell.

The present invention also provides a method of manufacturing a direct alcohol fuel cell comprising an anode having an anode catalyst layer, a cathode having a cathode catalyst layer, and a solid polymer electrolyte membrane arranged between the anode and cathode, the direct alcohol fuel cell generating electricity by supplying the anode with alcohol and water; the method comprising the steps of forming the cathode catalyst layer by using a metal complex and/or a metal complex fired product formed by firing the metal complex; and forming the solid polymer electrolyte membrane by plasma polymerization.

This manufacturing method can efficiently manufacture the direct alcohol fuel cell in accordance with the above-mentioned first aspect of the present invention. In particular, forming the solid polymer electrolyte membrane by plasma polymerization can make the electrolyte membrane thinner, and thus can reduce the resistance of the electrolyte membrane. Also, the solid polymer electrolyte membrane can be formed by plasma polymerization on a surface of a conventional cation exchange membrane or anion exchange membrane, which makes it possible to ameliorate the alcohol permeation characteristic, and restrain the crossover from occurring.

Further, the present invention provides a method of manufacturing a direct alcohol fuel cell comprising an anode having an anode catalyst layer, a cathode having a cathode catalyst layer, and a solid polymer electrolyte membrane arranged between the anode and cathode, the direct alcohol fuel cell generating electricity by supplying the anode with alcohol and water; the method comprising the steps of forming the cathode catalyst layer by using silver; and forming an anion exchange membrane by plasma polymerization, so as to yield the solid polymer electrolyte membrane constituted by the anion exchange membrane.

This manufacturing method can efficiently manufacture the direct alcohol fuel cell in accordance with the above-mentioned second aspect of the present invention. In particular, forming the solid polymer electrolyte membrane by plasma polymerization can make the electrolyte membrane thinner, and thus can reduce the resistance of the electrolyte membrane. Also, the solid polymer electrolyte membrane can be formed by plasma polymerization on a surface of a conventional anion exchange membrane, which makes it possible to ameliorate the alcohol permeation characteristic, and restrain the crossover from occurring.

Effect of the Invention

The present invention can provide a direct alcohol fuel cell which can fully restrain the cell voltage from being lowered by the crossover, thereby stably attaining a sufficient output voltage for a long period. It can also provide a method of manufacturing a direct alcohol fuel cell, which can efficiently manufacture the direct alcohol fuel cell.

EXPLANATIONS OF NUMERALS

1 . . . solid polymer electrolyte membrane; 2 . . . anode catalyst layer; 3 . . . cathode catalyst layer; 4 . . . fuel diffusion layer; 5 . . . gas diffusion layer; 6, 7 . . . separator; 6a . . . fuel supply groove of the separator 6; 7a . . . gas supply groove of the separator 7; 8 . . . seal; 10 . . . direct alcohol fuel cell

BEST MODES FOR CARRYING OUT THE INVENTION

In the following, preferred embodiments of the present invention will be explained in detail with reference to the drawings. In the following explanation, parts identical or equivalent to each other will be referred to with numerals identical to each other without repeating their overlapping descriptions.

Figure 1:
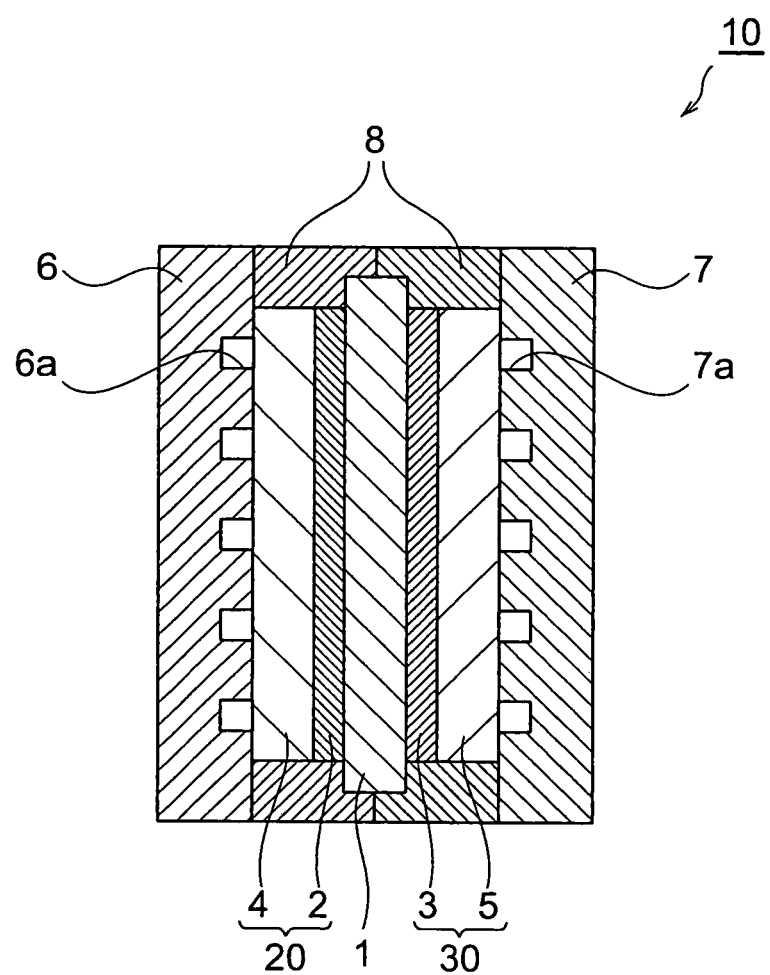
[FIG. 1] A schematic sectional view showing a basic structure of a preferred embodiment of the direct alcohol fuel cell in accordance with the present invention.

FIG. 1 is a schematic sectional view showing a basic structure of a preferred embodiment of the direct alcohol fuel cell in accordance with the present invention. The direct alcohol fuel cell 10 shown in FIG. 1 (hereinafter simply referred to as "fuel cell 10") is in the form of so-called membrane electrode assembly (MEA). The fuel cell 10 shown in FIG. 1 is mainly constructed by a solid polymer electrolyte membrane 1, an anode catalyst layer 2 and a cathode catalyst layer 3 which are in close contact with membrane surfaces of the electrolyte membrane 1, a fuel diffusion layer 4 in close contact with the outer face of the anode catalyst layer 2, a gas diffusion layer 5 in close contact with the outer face of the cathode catalyst layer 3, and seals 8.

In the fuel cell 10, an anode 20 is constructed by the anode catalyst layer 2 and the fuel diffusion layer 4, whereas a cathode 30 is constructed by the cathode catalyst layer 3 and the gas diffusion layer 5. The fuel diffusion layer 4 and gas diffusion layer 5 in the anode 20 and cathode 30 are typically made of porous conductive base materials. Though the diffusion layers 4 and 5 are not essential structures in the fuel cell 10, the anode 20 and cathode 30 are preferably provided with the diffusion layers 4 and 5, since they promote the dispersion of a fuel into the anode catalyst layer 2 and the dispersion of a gas into the cathode catalyst layer 3 while having a function of a collector.

In the fuel cell 10, a separator 6 formed with a groove 6a to become a flow path for a fuel is arranged on the outside of the anode 20, whereas a separator 7 formed with a groove 7a to become a flow path for a gas is arranged on the outside of the cathode 30. An alcohol such as methanol, ethanol, ethylene glycol, glycerin, or erythritol is directly supplied as a fuel to the anode 20 side through the groove 6a of the separator 6, whereas oxygen or air is supplied to the cathode 30 side through the groove 7a of the separator 7.

The fuel cell 10 of the present invention is mainly characterized in that a metal complex and/or a metal complex fired product or silver is used as a catalyst constituting the cathode catalyst layer 3 in a direct alcohol fuel cell. First, the cathode catalyst layer 3 will be explained.

Though the cathode catalyst layer 3 is not restricted in particular in terms of structure as long as it contains a metal complex and/or a metal complex fired product formed by firing the metal complex as a catalyst, it has a structure including a carrier catalyst in which a carbon material carries the metal complex and/or metal complex fired product or silver and an ion exchange resin, for example.

When using a metal complex and/or a metal complex fired product formed by firing the metal complex as a catalyst, examples of the metal complex include metal phthalocyanines such as iron phthalocyanine, cobalt phthalocyanine, copper phthalocyanine, manganese phthalocyanine, and zinc phthalocyanine; metal porphyrins such as iron tetraphenylporphyrin, copper tetraphenylporphyrin, zinc tetraphenylporphyrin, and cobalt tetraphenylporphyrin; and metal complexes such as ruthenium ammine complex, cobalt ammine complex, and cobalt ethylenediamine complex. When using a metal complex fired product, the metal complex fired product can be obtained by firing these metal complexes.

Among them, the metal complex preferably has a porphyrin ring or phthalocyanine ring, more preferably includes at least one species of metal selected from the group consisting of Co, Fe, Ni, Cu, Mn, and V as a center metal. Preferred as the metal complex fired product are those formed by firing the metal complexes having a porphyrin ring or phthalocyanine ring. More preferred are those formed by firing the metal complexes including at least one species of metal selected from the group consisting of Co, Fe, Ni, Cu, Mn, and V as a center metal.

These metal complexes and the metal complex fired products formed by firing the same exhibit an extremely weak oxidizing power with respect to alcohol while having a sufficient reducing power with respect to oxygen, and thus tend to make it possible to yield a high output voltage while being capable of fully restraining the cell voltage from being lowered by the crossover.

Here, when yielding the metal complex fired product, the metal complex can be fired for 1 to 20 hours in an inert atmosphere at 500 to 800° C.

The firing may be effected by a metal complex alone, but is preferably performed in a state where a carbon material carries the metal complex. This tends to be able to yield a carrier catalyst in which the metal complex or metal complex fired product is in close contact with the carbon material in a highly dispersed state. Using such a carrier catalyst can increase a three-phase boundary where a gas containing oxygen to become a reactant, the catalyst, and the electrolyte membrane 1 coexist, whereby the electrode reaction of the cathode can be generated efficiently.

Examples of the carbon material to become a carrier for the metal complex and/or metal complex fired product or silver include carbon black, activated carbon, carbon nanotubes, and carbon nanohorns. Preferred among them is carbon black. When using carbon black as the carbon material, its specific surface area is preferably 50 to 1000 m$^2$/g from the viewpoint of forming a greater three-phase boundary.

Further, in the carrier catalyst, the average primary particle size of the carbon material is preferably 10 to 100 nm, whereas the average primary particle size of the metal complex and metal complex fired product is preferably 10 to 500 nm. This can form a greater three-phase boundary.

When using silver as a catalyst in the cathode catalyst layer 3, it can be used as a carrier catalyst in a state carried by the carbon material without firing. At this time, the average particle size of silver is preferably 1 to 20 nm, whereby a greater three-phase boundary can be formed.

When using a carrier catalyst in which a carbon material carries silver, the amount of carried silver is preferably 10 to 80 mass % based on the total amount of the carrier catalyst. When the carried amount is less than 10 mass %, the amount of the catalyst in the catalyst layer tends to become insufficient, so that the three-phase boundary may not be secured sufficiently. When the carried amount exceeds 80 mass %, on the other hand, silver particles tend to aggregate together, thereby lowering the catalytic activity. When using a carrier catalyst in which a carbon material carries a metal complex and/or metal complex fired product, the amount of carried metal complex and/or metal complex fired product is preferably such that the total mass of the center metal of the metal complex and metal complex fired product is 1 to 10 mass % based on the total amount of the carrier catalyst. When the carried amount (the total mass of the center metal of the metal complex and metal complex fired product) is less than 1 mass %, the amount of catalyst in the catalyst layer tends to become insufficient, so that the three-phase boundary may not be secured sufficiently. When the carried amount (the total mass of the center metal of the metal complex and metal complex fired product) exceeds 10 mass %, on the other hand, the ratio of the carbon material tends to decrease, thereby making it harder to secure a sufficient conductivity.

The ion exchange resin contained in the cathode catalyst layer 3 functions as a binder for binding the carrier catalyst. The ion exchange resin is not restricted in particular as long as it can bind the carrier catalyst, but preferably has the same ion exchangeability as that of the ion exchange resin used in the electrolyte membrane 1 constituting the fuel cell 10. Namely, when using silver as a catalyst, the electrolyte membrane 1 is formed by an anion exchange resin, whereby the above-mentioned ion exchange resin is also preferably an anion exchange resin. When using a metal complex and/or metal complex fired product as a catalyst, it will be preferred if an anion exchange resin and a cation exchange resin are used in cases where the electrolyte membrane 1 is formed by an anion exchange resin and a cation exchange resin, respectively. Consequently, ion conduction tends to be performed favorably in the contact boundary among the ion exchange resin, catalyst, and electrolyte membrane 1, thereby making it possible to improve the energy density. An anion exchange resin is also preferably employed in the electrolyte membrane 1 when using a metal complex and/or metal complex fired product as a catalyst, whereby the above-mentioned ion exchange resin is preferably an anion exchange resin in the present invention.

Preferred as the anion exchange resin is one made of a polymer compound having a cation group within a molecule. Preferably, the cation group is at least one species selected from the group consisting of pyridinium, alkylammonium, and imidazolium groups. Examples of such an anion exchange resin include poly-4-vinylpyridine, poly-2-vinylpyridine, poly-2-methyl-5-vinylpyridine, and poly-1-pyridine-4-ylcarbonyloxyethylene which are processed into quaternary ammonium. Here, poly-4-vinylpyridine can be processed into quaternary ammonium by causing poly-4-vinylpyridine to react with an alkyl halide such as methyl bromide or ethyl bromide.

For example, perfluorocarbon polymers having sulfonate groups, polysulfonate resins, and perfluorocarbon polymers having phosphonate groups or carbonate groups can be used as the cation exchange resin.

The content of the ion exchange resin is preferably 10 to 50 mass % based on the total amount of the cathode catalyst layer 3. When the content is less than 10 mass %, the catalyst is harder to be covered thinly and uniformly with the ion exchange resin. When the content exceeds 50 mass %, the catalyst is thickly covered with the ion exchange resin, so that the gas is harder to disperse, whereby the output characteristic tends to decrease.

Even when alcohol has reached the cathode 30 because of the crossover, the cathode catalyst layer 3 constructed by the above-mentioned materials in the fuel cell 10 has a sufficiently weak action of oxidizing this alcohol, and thus can fully restrain the cathode 30 from lowering its potential. Therefore, the cell voltage can fully be restrained from being lowered by the crossover, whereby a sufficient output voltage can stably be obtained for a long period.

The thickness of the cathode catalyst layer 3 is preferably 10 to 300 µm. When the thickness is less than 10 µm, the amount of catalyst tends to become insufficient. The thickness exceeding 300 µm tends to obstruct the ion migration and gas diffusion, thereby increasing the resistance and lowering the output characteristic.

For promoting gas diffusion into the cathode catalyst layer 3, the cathode 30 has the gas diffusion layer 5. An example of materials constituting the gas diffusion layer 5 is an electronically conductive porous body. Preferred as such a porous body are carbon cloth, carbon paper, and the like.

The thickness of the gas diffusion layer 5 is preferably 10 to 300 µm. When the thickness is less than 10 µm, water repellency and gas diffusion tend to become insufficient. When the thickness exceeds 300 µm, the cell volume tends to increase, thereby lowering the energy density.

The anode 20 will now be explained. The anode 20 is constructed by the anode catalyst layer 2 and fuel diffusion layer 4.

For example, the anode catalyst layer 2 has a structure including a carrier catalyst in which a carbon material carries a catalyst, and an ion exchange resin.

Examples of the catalyst include noble metals and noble metal alloys. Pt is preferred as a noble metal, whereas alloys of Pt with Ru, Sn, Mo, Ni, Co, and the like are preferred as a noble metal alloy. Among them, a noble metal alloy of Pt—Ru which is less likely to poison the catalyst is preferably used.

As the carbon material and ion exchange resin constituting the anode catalyst layer 2, the same materials as those used in the cathode catalyst layer 3 are usable.

In the anode catalyst layer 2, the amount of carried catalyst with respect to the carbon material is preferably 10 to 85 mass % based on the total amount of the carrier catalyst. When the carried amount is less than 10 mass %, the amount of the catalyst in the catalyst layer tends to become insufficient, so that the three-phase boundary may not be secured sufficiently. When the carried amount exceeds 85 mass %, on the other hand, catalyst particles tend to aggregate together, thereby lowering the catalytic activity.

In the anode catalyst layer 2, the content of the ion exchange resin is preferably 10 to 50 mass % based on the total amount of the anode catalyst layer 2. When the content is less than 10 mass %, the catalyst is harder to be covered thinly and uniformly with the ion exchange resin. When the content exceeds 50 mass %, the catalyst is thickly covered with the ion exchange resin, so that the gas is harder to disperse, whereby the output characteristic tends to decrease.

The thickness of the anode catalyst layer 2 is preferably 10 to 300 µm. When the thickness is less than 10 µm, the amount of catalyst tends to become insufficient. The thickness exceeding 300 µm tends to obstruct the ion migration and gas diffusion, thereby increasing the resistance and lowering the output characteristic.

Usable as constituent materials for the fuel dispersion layer 4 are those similar to the materials used in the gas diffusion layer 5.

The thickness of the fuel diffusion layer 4 is preferably 10 to 300 µm. When the thickness is less than 10 µm, gas diffusion tends to become insufficient. When the thickness exceeds 300 µm, the cell volume tends to increase, thereby lowering the energy density.

The electrolyte membrane 1 arranged between the anode 20 and cathode 30 will now be explained.

When using silver as a catalyst contained in the cathode catalyst layer 3, an anion exchange membrane is employed as the electrolyte membrane 1. Preferred as a constituent material for the anion exchange membrane is a polymer compound having a cation group within a molecule, examples of which include those similar to the anion exchange resin used in the cathode catalyst layer 3. As the polymer compound constituting the electrolyte membrane 1, those having a molecular weight greater than that of the anion exchange resin used in the cathode catalyst layer 3 are typically employed.

Using silver as a catalyst contained in the cathode catalyst layer 3 while using an anion exchange membrane as the electrolyte member 1 in the fuel cell 10 can fully restrain silver from corroding. This can fully keep silver from lowering its catalytic activity, and stably attain a sufficient output voltage for a long period. Using the anion exchange membrane and silver catalyst in combination can fully lower the overvoltage in the cathode 30, and thus can improve the energy density.

When using a metal complex and/or metal complex fired product as a catalyst contained in the cathode catalyst layer 3, not only the anion exchange membrane but also a cation exchange membrane is usable as the electrolyte membrane 1. Examples of constituent materials for the cation exchange membrane are those similar to the cation exchange resin used in the cathode catalyst layer 3. The anion exchange membrane is also preferably employed as the electrolyte membrane 1 when using a metal complex and/or metal complex fired product as a catalyst. Using the anion exchange membrane can fully restrain the metal complex and metal complex fired product from corroding, and thus can improve the stability of the catalyst. This tends to stably attain a more sufficient output voltage for a long period. Using an anion exchange membrane in combination with a metal complex and/or metal complex fired product tends to be able to fully lower the overvoltage in the cathode 30, thereby improving the energy density.

The thickness of the electrolyte membrane 1 is preferably 20 to 250 µm. When the thickness is less than 20 µm, the mechanical strength tends to become insufficient. When the thickness exceeds 250 µm, the resistance of the electrolyte membrane tends to become so large that the output decreases.

The separators 6 and 7 will now be explained. In the fuel cell 10, the separator 6 formed with the groove 6a to become the fuel flow path is arranged on the outside of the anode 20, whereas the separator 7 formed with the groove 7a to become the gas flow path is arranged on the outside of the cathode 30.

The separators 6 and 7 are formed from a material having an electronic conductivity, whereas examples of this material include carbon, resin-molded carbon, titanium, and stainless steel.

The fuel cell 10 having the structure mentioned above is manufactured by the following methods depending on the species of catalyst used in the cathode catalyst layer 3.

First, a method of manufacturing the fuel cell 10 in the case using a metal complex fired product as a catalyst will be explained.

To begin with, for forming the cathode catalyst layer 3, a metal complex and a carbon material are mixed by a ball mill or the like, so as to yield a mixture. The mixing method, which may be either of dry or wet type, can be chosen as appropriate. Here, the amount of compounding the metal complex is preferably such that the mass of its center material is 0.1 to 10 mass %, more preferably 1 to 6 mass %, based on the total mass of the metal complex and carbon material. When the amount is less than 0.1 mass %, the ratio of the center metal tends to become so small that catalytically active sites may decrease. When the amount exceeds 10 mass %, the ratio of the carbon material tends to become relatively small, so that the conductivity may become insufficient in the case where a carrier catalyst is formed.

Subsequently, thus obtained mixture is fired for about 1 to 20 hr in an inert atmosphere at 500° C. to 800° C., so as to yield a carrier catalyst in which the carbon material carries the metal complex fired product.

Next, a binder solution in which an ion exchange resin as a binder is dissolved in a solvent is prepared, the carrier catalyst is mixed into this solution, and the mixture is kneaded and formed into a coating. Here, the kneading and the forming of the coating can be effected by a typically employed kneader such as ball mill, biaxial kneader, or biaxial extruder.

Then, thus obtained coating is applied to a base material such as carbon paper, a PET film, or a PTFE film and dried, so as to make the cathode catalyst layer 3. Employable here as the coating method are doctor blading, nozzle method, screen printing, gravure coating, die coater, and the like.

For making the anode catalyst layer 2, a catalyst such as a noble metal or noble metal alloy and a carbon material are mixed by a ball mill or the like, so as to yield a carrier catalyst in which a carbon material carries the catalyst. The mixing method may be either of dry or wet type.

Subsequently, a binder solution in which an ion exchange resin as a binder is dissolved in a solvent is prepared, the carrier catalyst is mixed into this solution, and the mixture is kneaded and formed into a coating. Here, the kneading and the forming of the coating can be effected by a typically employed kneader such as ball mill, biaxial kneader, or biaxial extruder. As the binder, the same ion exchange resin as that used in the cathode catalyst layer is preferably used.

Then, thus obtained coating is applied to a base material such as carbon paper, a PET film, or a PTFE film and dried, so as to make the anode catalyst layer 2. Employable here as the coating method are doctor blading, nozzle method, screen printing, gravure coating, die coater, and the like.

On the other hand, the electrolyte membrane 1 is formed by plasma polymerization. Specifically, a monomer for forming the electrolyte membrane 1 and a plasma-assisted gas are introduced into a chamber, and an AC voltage is applied between the electrodes, so as to generate a plasma. Monomer molecules ionized by the plasma polymerize, so as to be deposited on a substrate, thus forming the electrolyte membrane 1 in a thin membrane form.

The electrolyte membrane 1 can also be formed by plasma polymerization on a conventional electrolyte membrane (such as a cation exchange membrane or anion exchange membrane, which will hereinafter be referred to as "base membrane"). In this case, the base membrane is activated by plasma beforehand, and the monomer is polymerized onto the ionized base membrane surface. Thus obtained electrolyte membrane 1 can restrain alcohol from permeating therethrough, and thus can more fully keep the cell voltage from decreasing.

Thereafter, the cathode catalyst layer 3 and anode catalyst layer 2 are transferred to the electrolyte membrane 1 from their base materials. The transfer can be effected by a method comprising the steps of bonding the catalyst layers 2 and 3 to the electrolyte membrane 1 by hot press or the like and then peeling off the base materials, or the like. The resulting product is further held between the fuel diffusion layer 4 and gas diffusion layer 5, so as to make a multilayer body comprising the anode 20, cathode 30, and electrolyte membrane 1.

The above-mentioned multilayer body may be made by transferring the cathode catalyst layer 3 and anode catalyst layer 2 to the gas diffusion layer 5 and fuel diffusion layer 4, so as to form the anode 20 and cathode 30, respectively, and then causing them to hold the electrolyte membrane 1 therebetween. Coatings for forming the cathode catalyst layer 3 and anode catalyst layer 2 may directly be applied to the gas diffusion layer 5 and fuel diffusion layer 4 instead of the base materials, so as to form the anode 20 and cathode 30, respectively. Alternatively, the above-mentioned multilayer body may be made by directly applying the respective coatings for forming the catalyst layers 2 and 3 to the electrolyte membrane 1.

Thus obtained multilayer body is held between the separator 6 formed with the fuel supply groove 6a and the separator 7 formed with the gas supply groove 7a, and then is closed with the seals 8, so as to complete the making of the fuel cell (membrane electrode assembly) 10.

The fuel cell 10 in the case employing a metal complex as a catalyst can be made by the same method as that in the above-mentioned case using a metal complex fired product as a catalyst except that no firing is effected when attaining the carrier catalyst.

The fuel cell 10 in the case using silver as a catalyst can be made by the same method as that in the above-mentioned case using a metal complex fired product as a catalyst except that the cathode catalyst layer 3 is made by the following procedure.

First, a carrier catalyst in which a carbon material carries silver is obtained. As the method of making silver-carrying carbon which is a carrier catalyst, chemical reduction, vapor-phase reduction, reductive pyrolysis, sputtering, and the like can be employed, for example. It may also be formed by mixing silver and a carbon material by a ball mill or the like. This mixing method, which may be either of dry or wet type, can also be chosen as appropriate.

Next, a binder solution in which an ion exchange resin as a binder is dissolved in a solvent is prepared, the carrier catalyst is mixed into this solution, and the mixture is kneaded and formed into a coating. Here, the kneading and the forming of the coating can be effected by a typically employed kneader such as ball mill, biaxial kneader, or biaxial extruder.

Then, thus obtained coating is applied to a base material such as carbon paper, a PET film, or a PTFE film and dried, so as to make the cathode catalyst layer 3. Employable here as the coating method are doctor blading, nozzle method, screen printing, gravure coating, die coater, and the like.

EXAMPLES

In the following, the present invention will be explained more specifically with reference to examples and comparative examples, though the present invention is not limited to the following examples.

Manufacturing Example 1

Making of an Electrode

By a ball mill, 0.8 g of 5,10,15,20-tetraphenylporphyrinatocobalt (II) (TPPCo; manufactured by Aldrich) and 0.6 g of carbon black (product name: DENKABLACK; manufactured by Denki Kagaku Kogyo) were mixed. The resulting mixture was fired for 3 hr in an argon atmosphere at 600° C., so as to yield a fired product. From this fired product, 20 mg were collected and suspended in a mixed solution made of 0.18 ml of 5-mass-% Nafion (registered trademark) solution (manufactured by Aldrich) and 0.82 ml of ethanol. Subsequently, 10 μl of thus obtained suspension were applied dropwise onto a disk electrode having a diameter of 6 mm made of glassy carbon, so as to form a uniform coating membrane, which was then dried for 12 hr at 25° C., so as to produce an electrode.

Evaluation of the Electrode

Using thus produced electrode as a working electrode, platinum as a counter electrode, a reversible hydrogen electrode (RHE) as a reference electrode, and an oxygen-saturated 0.5-M aqueous solution of sulfuric acid ($H_2SO_4$) and an oxygen-saturated 1-M aqueous solution of potassium hydroxide (KOH) as electrolytes, current values were read after respective potentials were held for 500 sec while being stepped at intervals of 50 mV from 0.9 V to 0.05 V, and oxygen reduction current densities were measured in a steady-state polarization. After performing the above-mentioned measurement for each electrolyte, 5.28 ml of a 1-M aqueous solution of methanol were added to 200 ml of each electrolyte, and then the same measurement was conducted. Table 1 shows the values of oxygen reduction current density at 0.8 V.

Manufacturing Example 2

Making of an Electrode

A coating liquid was prepared by dissolving 23 mg of 5,10,15,20-tetraphenylporphyrinatoiron (II) chloride (TPPFeCl; manufactured by Aldrich) in 3 ml of dimethyl sulfoxide (DMSO). From this coating liquid, 10 μl were applied dropwise onto a disk electrode having a diameter of 6 mm made of glassy carbon, so as to form a uniform coating membrane, which was then dried for 12 hr at 25° C., so as to produce an electrode.

Evaluation of the Electrode

Using thus produced electrode as a working electrode, platinum as a counter electrode, a reversible hydrogen electrode (RHE) as a reference electrode, and an oxygen-saturated 1-M aqueous solution of potassium hydroxide (KOH) as an electrolyte, current values were read after respective potentials were held for 500 sec while being stepped at intervals of 50 mV from 0.9 V to 0.05 V, and oxygen reduction current densities were measured in a steady-state polarization. After performing the above-mentioned measurement while using the 1-M aqueous solution of potassium hydroxide as the electrolyte, 5.28 ml of a 1-M aqueous solution of methanol were added to 200 ml of the 1-M aqueous solution of potassium hydroxide, and then the same measurement was conducted. Table 1 shows the values of oxygen reduction current density at 0.8 V.

Manufacturing Example 3

Making of an Electrode

A coating liquid was prepared by dissolving 5 mg of silver-carrying carbon (whose amount of carried silver based on the total amount of silver-carrying carbon was 20 mass %) in 0.33 ml of ethanol. From this coating liquid, 10 μl were applied dropwise onto a disk electrode having a diameter of 6 mm made of glassy carbon, so as to form a uniform coating membrane, which was then dried for 12 hr at 25° C., so as to produce an electrode.

Evaluation of the Electrode

The electrode was evaluated by the same method as that of Manufacturing Example 2 except that thus produced electrode was used as a working electrode. Table 1 shows the results.

Manufacturing Example 4

Making and Evaluation of an Electrode

An electrode was obtained as in Manufacturing Example 2 except that 23 mg of 5,10,15,20-tetraphenylporphyrinatocobalt (II) were used instead of 23 mg of 5,10,15,20-tetraphenylporphyrinatoiron (II) chloride (TPPFeCl; manufactured by Aldrich). The electrode was evaluated by the same method as that of Manufacturing Example 2 except that this electrode was used as a working electrode. Table 1 shows the results.

Manufacturing Example 5

Making and Evaluation of an Electrode

An electrode was obtained as in Manufacturing Example 2 except that 23 mg of nickel (II) phthalocyanine were used instead of 23 mg of 5,10,15,20-tetraphenylporphyrinatoiron (II) chloride (TPPFeCl; manufactured by Aldrich). The electrode was evaluated by the same method as that of Manufacturing Example 2 except that this electrode was used as a working electrode. Table 1 shows the results.

Comparative Manufacturing Example 1

Making and Evaluation of an Electrode

A platinum disk electrode having a diameter of 6 mm was prepared and used as an electrode. The electrode was evaluated by the same method as that of Manufacturing Example 1 except that this electrode was used as a working electrode. As the electrolyte, an oxygen-saturated 0.5-M aqueous solution of sulfuric acid ($H_2SO_4$) was used. Table 1 shows the results.

Comparative Manufacturing Example 2

Making and Evaluation of an Electrode

An electrode was obtained as in Manufacturing Example 1 except that one firing carbon black alone without using 5,10,15,20-tetraphenylporphyrinatocobalt (II) was used as a fired product. The electrode was evaluated by the same method as that of Manufacturing Example 1 except that this electrode was used as a working electrode. As the electrolyte, an oxygen-saturated 0.5-M aqueous solution of sulfuric acid ($H_2SO_4$) was used. Table 1 shows the results.

TABLE 1

| | Catalyst layer material | Electrolyte | Oxygen reduction current density at 0.8 V/μA · cm$^{-2}$ Without methanol | With methanol |
|---|---|---|---|---|
| Manufacturing Example 1 | TPPCo/C fired product | 0.5M $H_2SO_4$ 1M KOH | 43.2 79.1 | 33.6 155.0 |
| Manufacturing Example 2 | TPPFeCl | 1M KOH | 7.0 | 17.3 |
| Manufacturing Example 3 | Ag/C | 1M KOH | 54.5 | 47.1 |
| Manufacturing | TPPCo | 1M KOH | 8.42 | 17.4 |

TABLE 1-continued

|  | Catalyst layer material | Electrolyte | Oxygen reduction current density at 0.8 V/μA·cm$^{-2}$ Without methanol | With methanol |
|---|---|---|---|---|
| Example 4 Manufacturing Example 5 | Ni phthalocyanine | 1M KOH | 10.8 | 20.9 |
| Comparative Manufacturing Example 1 | Pt | 0.5M H$_2$SO$_4$ | 474.0 | −4846.1 |
| Comparative Manufacturing Example 2 | C fired product | 0.5M H$_2$SO$_4$ | −0.6 | −3.3 |

As shown in Table 1, an oxygen reduction current flows in Manufacturing Examples 1 to 5 even after adding methanol, whereas an oxidation current flows on the contrary in Comparative Manufacturing Examples 1 and 2 after adding methanol. This has proved that Manufacturing Examples 1 to 5 attain characteristics as a cathode of a direct alcohol fuel cell, whereas Comparative Manufacturing Examples 1 and 2 are hard to generate electricity by functioning as a cathode.

Methanol permeating from the anode so as to reach the cathode and lower the oxygen reduction current of the cathode becomes a problem in direct methanol fuel cells. Using electrodes having such a high methanol resistance that the ratio of current reduction caused by methanol is low (or the current reduction is not caused) can prevent direct alcohol fuel cells from lowering their output. Therefore, using the electrodes of Manufacturing Examples 1 to 5 can solve the problem of crossover, and thus can provide direct alcohol fuel cells having a sufficient energy density.

Example 1

Making of a Fuel Cell

Silver-carrying carbon (whose amount of carried silver based on the total amount of silver-carrying carbon was 20 mass %), 8-mass-% quaternized polyvinylpyridine (manufactured by Aldrich)/methanol solution, water, and 2-propanol were compounded such that the mass ratio of silver-carrying carbon, quaternized polyvinylpyridine/methanol solution, water, and 2-propanol was 1:4:1:5, and they were mixed by a ball mill, so as to prepare a coating liquid for forming a cathode catalyst layer.

Next, thus obtained coating liquid was applied onto a PET film with a bar coater. Here, the amount of coating was adjusted such that the content of Ag element in the resulting cathode catalyst layer was 0.4 mg/cm$^2$. The applied coating was then dried for 3 hr at 25° C., so as to form a cathode catalyst layer.

The cathode catalyst layer formed on the PET film was transferred onto a surface of AHA (product name; manufactured by Tokuyama) as an electrolyte membrane at a pressure of 16 kgf/cm$^2$ and a temperature of 130° C. Using a catalyst layer carrying Pt—Ru as an anode catalyst layer, and carbon paper having a thickness of 120 μm as a gas diffusion layer, a cell having the structure shown in FIG. 1 was made.

Fuel Cell Evaluation 1

Figure 2:
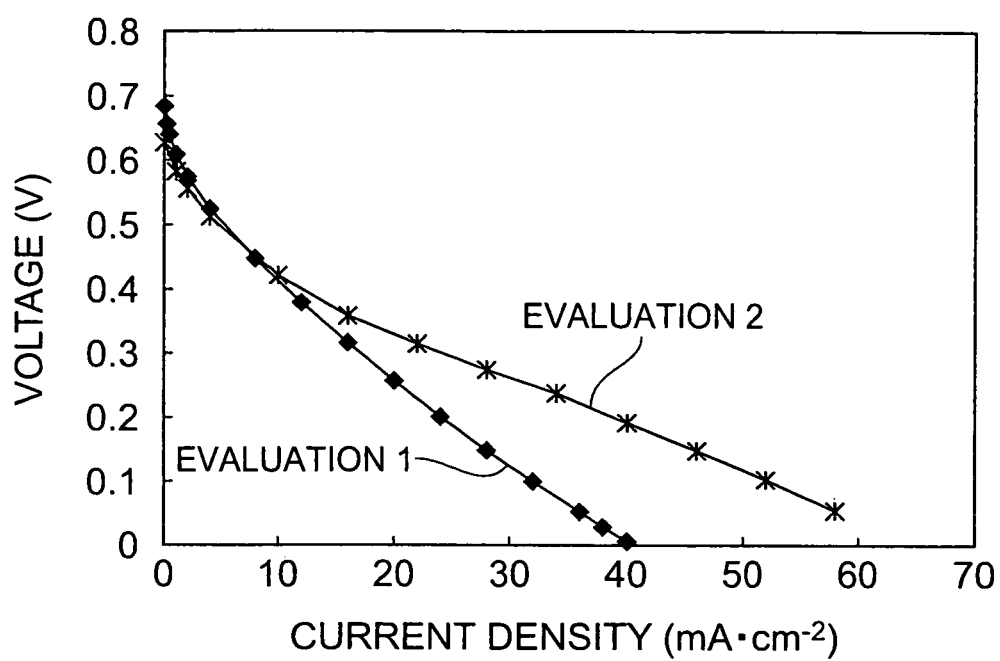
[FIG. 2] A graph showing the relationship between current density and voltage obtained when performing a cell power generation test for the direct alcohol fuel cell of Example 1.
Figure 3:
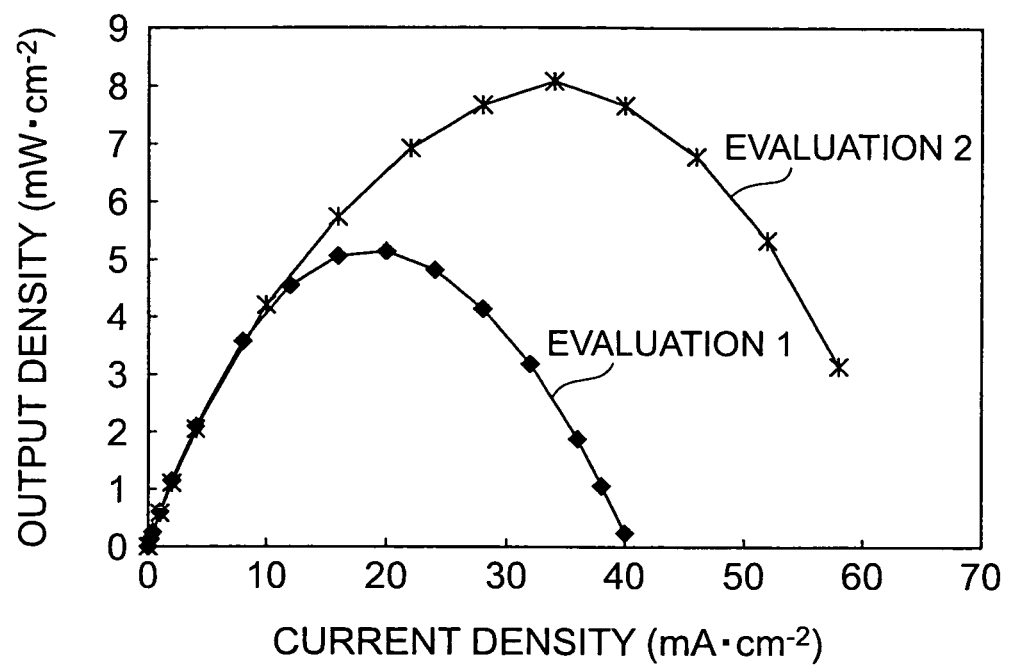
[FIG. 3] A graph showing the relationship between current density and output density obtained when performing a cell power generation test for the direct alcohol fuel cell of Example 1.

In the direct alcohol fuel cell of Example 1 mentioned above, the anode was supplied with a fuel in which 1-M methanol was mixed with a 1-M aqueous solution of potassium hydroxide. The cathode was supplied with humidified oxygen at 50° C. While keeping the cell at 50° C., a cell power generation test was conducted by the constant current. FIGS. 2 and 3 show the relationship between current density and voltage and the relationship between current density and output density, respectively, at that time.

Fuel Cell Evaluation 2

A cell power generation test was conducted as in the above-mentioned evaluation 1 except that the anode was supplied with a fuel in which 3-M ethylene glycol was mixed with a 1-M aqueous solution of potassium hydroxide. FIGS. 2 and 3 show the relationship between current density and voltage and the relationship between current density and output density, respectively, at that time.

As can be seen from the results shown in FIGS. 2 and 3, it has been proved that the direct alcohol fuel cell of Example 1 yields sufficient cell voltage and output density.

Industrial Applicability

As explained in the foregoing, the present invention can provide a direct alcohol fuel cell which can fully restrain the cell voltage from being lowered by the crossover, thereby stably attaining a sufficient output voltage for a long period. It can also provide a method of manufacturing a direct alcohol fuel cell, which can efficiently manufacture the direct alcohol fuel cell.

The invention claimed is:

1. A direct alcohol fuel cell comprising an anode having an anode catalyst layer, a cathode having a cathode catalyst layer, and a solid polymer electrolyte membrane arranged between the anode and cathode, the direct alcohol fuel cell generating electricity by supplying the anode with alcohol and water; wherein:
    the solid polymer electrolyte membrane is an anion exchange membrane,
    the cathode catalyst layer contains silver as a catalyst,
    the cathode catalyst layer contains an anion exchange resin as a binder, the anion exchange resin being poly-4-vinylpyridine, poly-2-vinylpyridine, poly-2-methyl-5-vinylpyridine or poly-1-pyridine-4-ylcarbonyloxyethylene which are processed into quaternary ammonium,
    the cathode catalyst layer does not contain a cation exchange resin,
    the catalyst is bound by the anion exchange resin in the cathode catalyst layer, and
    the catalyst, the anion exchange resin, and the anion exchange membrane form a contact interface.

2. A direct alcohol fuel cell according to claim 1, wherein the catalyst includes a carrier catalyst having a carbon material carrying the silver.

3. A direct alcohol fuel cell according to claim 1, wherein the anion exchange membrane is constituted by a polymer compound having a cation group within a molecule.

4. A direct alcohol fuel cell according to claim 1, wherein the alcohol is at least one species selected from the group consisting of methanol, ethanol, ethylene glycol, glycerin, and erythritol.

5. A direct alcohol fuel cell comprising an anode having an anode catalyst layer, a cathode having a cathode catalyst layer, and a solid polymer electrolyte membrane arranged between the anode and cathode, the direct alcohol fuel cell generating electricity by supplying the anode with alcohol and water; wherein:
    the solid polymer electrolyte membrane is an anion exchange membrane,
    the cathode catalyst layer contains silver as a catalyst,
    the cathode catalyst layer contains an anion exchange resin as a binder, the anion exchange resin being poly-4-vinylpyridine, poly-2-vinylpyridine, poly-2-methyl-5-vinylpyridine or poly-1-pyridine-4-ylcarbonyloxyethylene which are processed into quaternary ammonium, the cathode catalyst layer does not contain a cation exchange resin, and the catalyst is bound by the anion exchange resin in the cathode catalyst layer.

6. A direct alcohol fuel cell according to claim 5, wherein the catalyst includes a carrier catalyst having a carbon material carrying the silver.

7. A direct alcohol fuel cell according to claim 5, wherein the anion exchange membrane is constituted by a polymer compound having a cation group within a molecule.

8. A direct alcohol fuel cell according to claim 5, wherein the alcohol is at least one species selected from the group consisting of methanol, ethanol, ethylene glycol, glycerin, and erythritol.

9. A direct alcohol fuel cell according to claim 1, wherein the anion exchange resin is poly-2-methyl-5-vinylpyridine or poly-1-pyridine-4-ylcarbonyloxyethylene which are processed into quaternary ammonium.

10. A direct alcohol fuel cell according to claim 1, wherein the anion exchange resin is poly-1-pyridine-4-ylcarbonyloxyethylene which is processed into quaternary ammonium.

11. A direct alcohol fuel cell according to claim 5, wherein the anion exchange resin is poly-2-methyl-5-vinylpyridine or poly-1-pyridine-4-ylcarbonyloxyethylene which are processed into quaternary ammonium.

12. A direct alcohol fuel cell according to claim 5, wherein the anion exchange resin is poly-1-pyridine-4-ylcarbonyloxyethylene which is processed into quaternary ammonium.

* * * * *